US012712292B2

(12) United States Patent
Hannum et al.

(10) Patent No.: US 12,712,292 B2
(45) Date of Patent: Aug. 18, 2026

(54) INSULATION PIERCING ELECTRICAL CONNECTOR

(71) Applicant: NEXTPOWER LLC, Fremont, CA (US)

(72) Inventors: Robert Joseph Hannum, Mountain View, CA (US); Charles Hu, Palo Alto, CA (US)

(73) Assignee: NEXTPOWER LLC, Fremont, CA (US)

( * ) Notice: Subject to any disclaimer, the term of this patent is extended or adjusted under 35 U.S.C. 154(b) by 0 days.

(21) Appl. No.: 19/309,099

(22) Filed: Aug. 25, 2025

(65) Prior Publication Data

US 2025/0392058 A1 Dec. 25, 2025

Related U.S. Application Data

(63) Continuation of application No. 18/801,932, filed on Aug. 13, 2024.

(60) Provisional application No. 63/519,768, filed on Aug. 15, 2023.

(51) Int. Cl.

*H01R 4/24* (2018.01)
*H01R 4/2433* (2018.01)
*H01R 25/16* (2006.01)
*H01R 43/01* (2006.01)

(52) U.S. Cl.

CPC ......... *H01R 4/2433* (2013.01); *H01R 25/161* (2013.01); *H01R 43/01* (2013.01)

(58) Field of Classification Search

CPC ...................................................... H01R 11/20
USPC .......................................................... 439/403
See application file for complete search history.

(56) References Cited

U.S. PATENT DOCUMENTS 2,307,690 A 1/1943 Lee
2,680,235 A 6/1954 Pierce
3,323,100 A 5/1967 Book
3,922,480 A 11/1975 Woofter et al.
3,985,416 A * 10/1976 Dola .................... H01R 4/2433 439/417
4,143,237 A 3/1979 Atkins
4,193,658 A 3/1980 Dittmann et al.
4,264,118 A 4/1981 Nijman
4,444,447 A * 4/1984 Markwardt .......... H01R 4/2454 439/409
5,139,434 A 8/1992 Goodman
5,833,488 A 11/1998 Roy et al.

(Continued)

*Primary Examiner* — Phuong K Dinh

(74) *Attorney, Agent, or Firm* — Fredrikson & Byron, P.A.

(57) ABSTRACT

In one or more embodiments, an insulation piercing electrical connector device, a system for connecting one or more cables to a larger sized cable via central busbar and a method for providing an insulation piercing electrical connector or a system for connecting one or more cables to a larger sized cable via central busbar are disclosed. The system for connecting one or more cables to a larger cable via central busbar includes a central busbar provided with at least one connection end, wherein the central busbar is also connected to one or more cables, and wherein at least one connection end is sharp such that it is capable of penetrating the insulation of the larger cable and makes an electrical connection between the one or more cables to the larger cable via central busbar when penetrated in the insulation of the larger cable.

18 Claims, 10 Drawing Sheets

(56) References Cited

U.S. PATENT DOCUMENTS

| | | | |
|---|---|---|---|
| 6,086,406 A * | 7/2000 | Francois .............. | H01R 4/2408 439/402 |
| 6,733,331 B2 | 5/2004 | Mccoy et al. | |
| 7,125,295 B2 | 10/2006 | Zhao et al. | |
| 8,444,431 B1 | 5/2013 | La Salvia | |
| 9,231,312 B2 | 1/2016 | Omori et al. | |
| 9,287,673 B2 | 3/2016 | Galla et al. | |
| 9,577,351 B2 | 2/2017 | Martin | |
| 9,595,777 B2 | 3/2017 | Byrne et al. | |
| 11,011,858 B2 | 5/2021 | Li et al. | |
| 11,605,906 B2 | 3/2023 | Robicheau et al. | |
| 2025/0253551 A1 | 8/2025 | Babic et al. | |

* cited by examiner

Pivoted torque arm and nut

Pivoted torque arm and nut
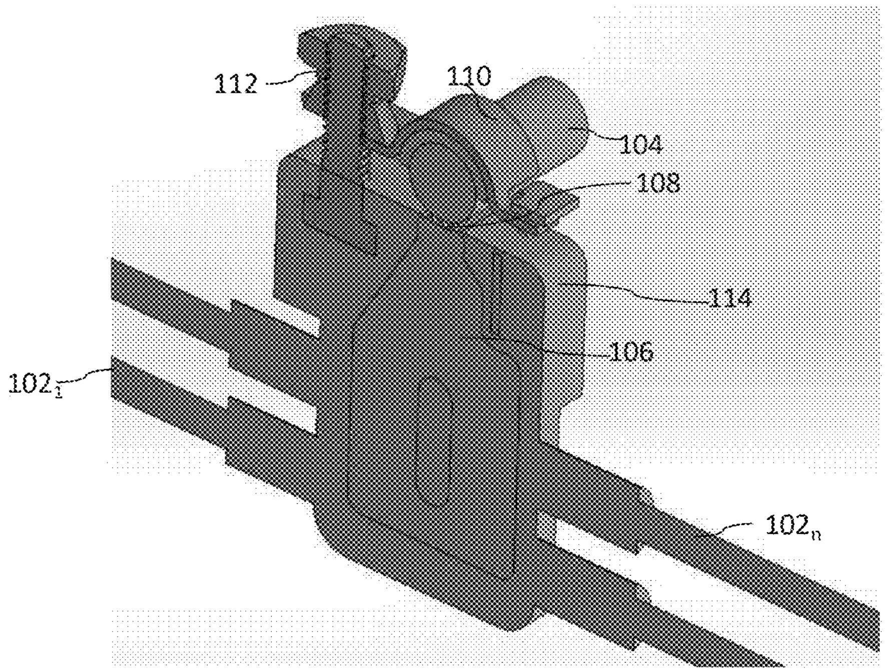
100' FIG. 1B

Cradle and nut combination

Cradle and nut combination

200'

Snap-in locking strap

300

Snap-in locking strap

300'

300″

300‴

Snap-in locking strap

300""

300"""

2-PIECE CLAM SHELL (MANIFOLD&CABLE CARRIER) AND STRAP DESIGN

400

500

INSULATION PIERCING ELECTRICAL CONNECTOR

CROSS-REFERENCE TO RELATED APPLICATIONS

This application is a continuation application of U.S. patent application Ser. No. 18/801,932, filed Aug. 13, 2024 which claims the benefit of U.S. Provisional Patent Application No. 63/519,768, filed Aug. 15, 2023, the entire contents of each of which are incorporated herein by reference.

FIELD OF THE INVENTION

The embodiments described herein relate generally to electrical connectors and more particularly to insulation piercing electrical connector.

SUMMARY

In one or more embodiments, an insulation piercing electrical connector device or a system for connecting one or more cables to a larger sized cable via central busbar and a method for providing an insulation piercing electrical connector or a system for connecting one or more cables to a larger sized cable via central busbar are disclosed.

In an embodiment, the system includes a central busbar including at least one connection end, wherein the central busbar is also connected to one or more cables, and wherein the at least one connection end is sharp such that it is capable of penetrating through the insulation of the larger cable to make an electrical connection between the one or more cables and the larger cable via central busbar.

In an embodiment, the method for providing an insulation piercing electrical connector or a system for connecting one or more cables to a larger cable via central busbar, the method includes: providing a central busbar with at least one connection end, wherein the central busbar is also connected to one or more cables; wherein the at least one connection end is configured to connect to the larger cable when penetrated in the insulation of the larger cable to make electrical connection between the one or more cables and the larger cable via central busbar.

BRIEF DESCRIPTION OF THE DRAWINGS

FIGS. 1A and 1B illustrate an example system for connecting one or more cables to a larger cable via central busbar according to one or more embodiments described herein.

DETAILED DESCRIPTION

Figure 1A:
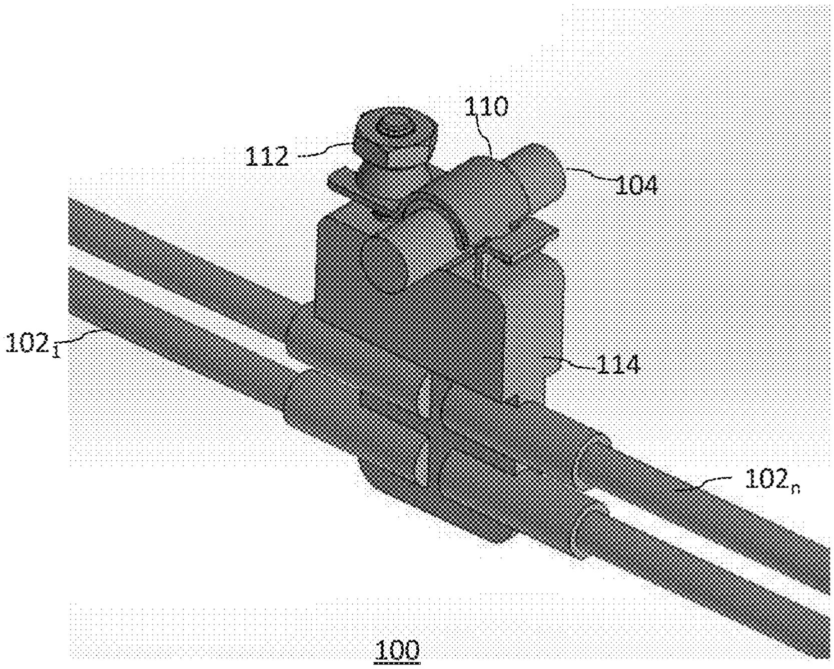

The embodiments described herein relate generally to electrical connectors and more particularly to insulation piercing electrical connector.

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Various methods are used to connect one or more cables physically and electrically in solar arrays using insulation piercing electrical connectors. The following embodiments described herein are unique and improved methods/devices that can physically and electrically connect two or more cables together in such fashion.

The embodiments described herein disclose systems and methods for connecting one or more cables to a larger cable via central busbar.

In an embodiment, the system or device for connecting one or more cables to a larger cable via central busbar, the system or device includes a central busbar including at least one connection end, wherein the central busbar is also connected to one or more cables, and wherein the at least one connection end is sharp such that it is capable of penetrating through the insulation of the larger cable to make an electrical connection between the one or more cables and the larger cable via central busbar.

In an embodiment, the method for providing an insulation piercing electrical connector device or a system for connecting one or more cables to a larger cable via central busbar includes: providing a central busbar with at least one connection end, wherein the central busbar is also connected to one or more cables; wherein the at least one connection end is configured to penetrate in the insulation of the larger cable to make electrical connection between the one or more cables and the larger sink cable via central busbar.

The purpose of this device/system and method is to make a quick and easy connection between multiple incoming cable sources to a larger size cable. The main use is in the Utility Solar Market Sector, where large solar fields give rise to needing cable grouping in a modular fashion. A person skilled in the art may readily understand that this device/method could be utilized in a multitude of indoor and/or outdoor power cabling configurations and is within the spirit and scope of the present invention described herein.

This device/system is made up of a main body, including a central busbar and a hold down mechanism. In the main body, the one or more incoming power cables are electrically and mechanically attached or connected to a central busbar which is made up of a current carrying material. At the bottom (or top depending on the orientation) towards the point of attachment to the larger sink cable of the central busbar, there is a piercing pattern also referred to herein as "teeth' or sharp pointy peaks capable of penetrating the insulation of the larger cable, which are used to penetrate the insulation of the larger sink cable. The "teeth" or sharp pointy peaks are made of material with electrical conductivity, which may be the same as central busbar. All of these cables and the central busbar may be self-contained in a main body of insulating material, only the sharp edges of the peaks are exposed.

Once the wires or cables are connected to the central busbar, by soldering or sonic welding, etc., the whole assembly is then insulated, except the "teeth", that bite into the main cable. Once connected (after the bite), the connection may be insulated too.

The second part of this assembly includes a process of connecting the larger cable to the main body assembly which includes the central busbar, when the larger cable is pierced or penetrated by the sharp pointy peaks provided on the central busbar, and may further include sealing the connection portion. Once connected (after piercing), the connection may be insulated too.

In one or more embodiments, one or more cables may be attached to the larger cable via central busbar by mechanisms including any of: a pivoted torque arm and nut, a cradle and nut combination, a snap-in locking strap, clamshell and strap combination, or a combination thereof.

The advantage of this device/method is that a quick and easy connect can be made by anyone with very little training and very simple tools when compared to current practice.

FIGS. 1A and 1B illustrate an example system or device for connecting one or more cables to a larger cable via central busbar 106 according to one or more embodiments described herein. The system 100 for connecting one or more cables $\mathbf{102}_1, \ldots \mathbf{102}_n$ to a larger cable 104 via central busbar 106 includes a central busbar including at least one connection end 108, wherein the central busbar is connected to one or more cables $\mathbf{102}_1, \ldots \mathbf{102}_n$, and wherein the at least one connection end 108 is sharp such that it is capable of penetrating through the insulation of the larger cable 104, and makes an electrical connection between the one or more cables $\mathbf{102}_1, \ldots \mathbf{102}_n$ and the larger cable 104 via central busbar 106 when penetrated in the insulation of the larger cable 104. The one or more incoming power cables $\mathbf{102}_1, \ldots \mathbf{102}_n$ are electrically and mechanically attached or connected to a central busbar 106 which is made of an electrically conductive material. The at least one connection end 108 is also made of an electrically conductive material.

As illustrated by FIGS. 1A and 1B, one or more cables $\mathbf{102}_1, \ldots \mathbf{102}_n$ may be attached to the larger cable 104 via central busbar 106 by mechanism including a pivoted torque arm 110 and nut 112. Using this mechanism and the device, the larger cable 104 is pierced, sealed, and connected to the main body assembly 114, which has at least one or more connecting cables $\mathbf{102}_1, \ldots \mathbf{102}_n$.

FIG. 1B illustrates a cross section 100' of the system or device 100 illustrated in FIG. 1A. As illustrated in FIG. 1B, the connecting end of the central busbar 106, is provided with "teeth' or sharp pointy peaks (a piercing pattern) 108, which are capable of penetrating the insulation of the larger cable and are used to penetrate the insulation of the larger cable 104 as illustrated in FIGS. 1A and 1B. The connection end 108 may include a piercing pattern, also referred to herein as "teeth' or sharp pointy peaks, which are capable of penetrating the insulation of the larger sink cable 104. The connection end 108 may be provided on a side of the of the central busbar 106 where the large sink cable 104 is to be attached.

The one or more power cables $\mathbf{102}_1, \ldots \mathbf{102}_n$ and the central busbar 106 may be self-contained in a main body of insulating material 114, only the sharp edges of the peaks 108 may be exposed. FIG. 1A illustrates a space formed by the pivoted torque arm 110 that accommodates the larger cable 104 that is connected to the main body assembly 114 using a pivoted torque arm 110 and tightened by nut 112, via "teeth' or sharp pointy peaks (a piercing pattern) 108 which are illustrated in FIG. 1B.

Figure 2A:
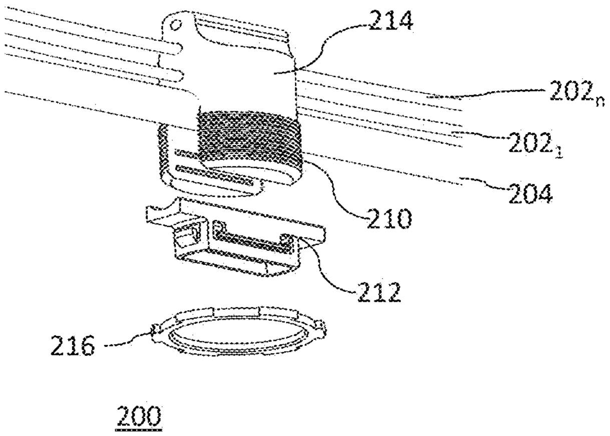
FIGS. 2A and 2B illustrate an example system for connecting one or more cables to a larger cable via central busbar according to one or more embodiments described herein.
Figure 2B:
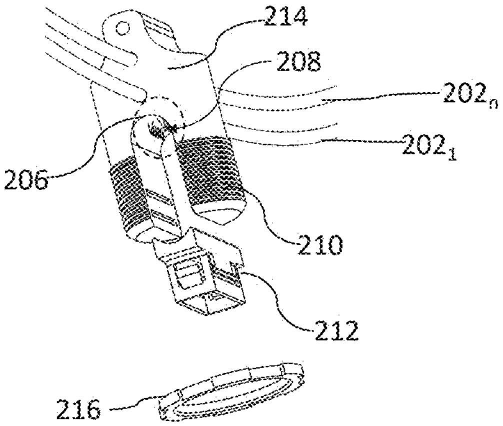

FIGS. 2A and 2B illustrate an additional or alternative system or device for connecting one or more cables to a larger cable via central busbar according to one or more embodiments described herein. The system or device for connecting one or more cables $\mathbf{202}_1, \ldots \mathbf{202}_n$ to a larger cable 204 via central busbar 206 includes a central busbar 206 including at least one connection end, wherein the central busbar 206 is connected to one or more cables $\mathbf{202}_1, \ldots \mathbf{202}_n$, and wherein the at least one connection end 208 is sharp such that it is capable of penetrating the insulation of the larger cable 204 and makes an electrical connection between the one or more cables $\mathbf{202}_1, \ldots \mathbf{202}_n$ and the larger cable 204 via central busbar 206 when penetrated in the insulation of the larger cable 204. The one or more incoming power cables $\mathbf{202}_1, \ldots \mathbf{202}_n$ are electrically and mechanically attached or connected to a central busbar 206 which is made of an electrically conductive material. The at least one connection end 208 is also made of an electrically conductive material. The connection end 208 may include a piercing pattern, also referred to herein as "teeth' or sharp pointy peaks, which are capable of penetrating the insulation of the larger cable 204. The connection end 208 may be provided on a side of the of the central busbar 206 where the large sink cable 204 is to be attached.

As illustrated by FIGS. 2A and 2B, the central bus bar 206 may be attached to the larger cable 204 by a mechanism including a cradle 212 and nut 216 combination, with threads 210 provided on the main body 214 for tightening the nut 216. Using this mechanism and the device, the larger cable 204 is pierced, sealed, and connected to the main body assembly 214 including the central busbar 206, to make electrical connection between the one or more cables $\mathbf{202}_1, \ldots \mathbf{202}_n$ and the larger cable 204 via central busbar 206.

As illustrated in FIG. 2B, at the bottom of the central busbar 206, there are "teeth' or sharp pointy peaks (a piercing pattern) 208, which may be used to penetrate the insulation of the larger sink cable 204. The one or more cables $\mathbf{202}_1, \ldots \mathbf{202}_n$ and the central busbar 206 may be self-contained in a main body of insulating material 214, only the sharp edges of the peaks 208 may be exposed.

FIGS. 3A, 3B, 3C, 3D and 3E illustrate an example system or device for connecting one or more cables to a larger cable via central busbar according to one or more embodiments described herein. The system for connecting one or more cables $\mathbf{302}_1, \ldots \mathbf{302}_n$ to a larger cable 304 via central busbar 306 includes a central busbar 306 including at least one connection end 308, wherein the central busbar 306 is connected to one or more cables $\mathbf{302}_1, \ldots \mathbf{302}_n$, and wherein the at least one connection end 308 is sharp such that it is capable of penetrating the insulation of the larger cable 304 to and makes an electrical connection between the one or more cables $\mathbf{302}_1, \ldots \mathbf{302}_n$ and the larger cable 304 via central busbar 306 when penetrated in the insulation of the larger cable 304. The one or more incoming power cables $\mathbf{302}_1, \ldots \mathbf{302}_n$ are electrically and mechanically attached or connected to a central busbar 306 which is made of an electrically conductive material. The at least one connection end 308 is made of an electrically conductive material. The connection end 308 may include a piercing pattern, also referred to herein as "teeth' or sharp pointy peaks capable of penetrating the insulation of the larger cable 304. The connection end 308 may be provided on a side of the of the central busbar 306 where the large sink cable 304 is to be attached.

As illustrated by FIGS. 3A, 3B, 3C, 3D, 3E and 3F, the central bus bar 306 may be attached to the larger cable 304 by mechanism including a snap-in locking strap illustrated as 310 and 312. Using this mechanism and the device, the larger cable 304 is pierced, sealed, and connected to the main body assembly 314, which includes the central busbar 306.

Figure 3A:
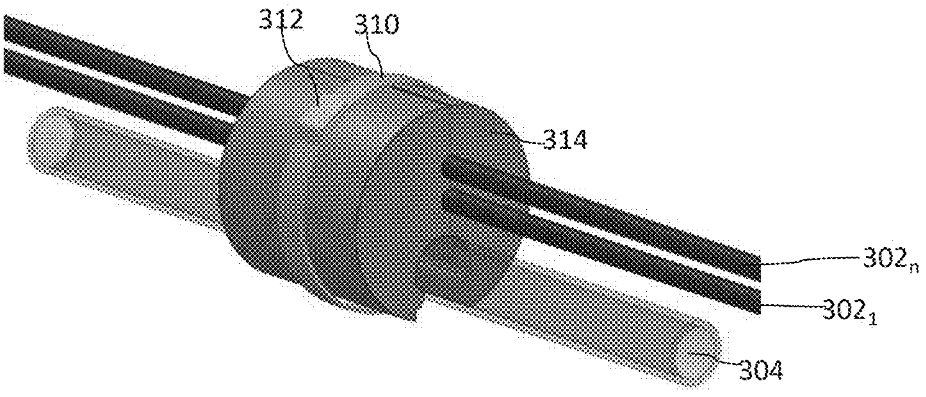
FIGS. 3A, 3B, 3C, 3D, 3E and 3F illustrate an example system for connecting one or more cables to a larger cable via central busbar according to one or more embodiments described herein.
Figure 3B:
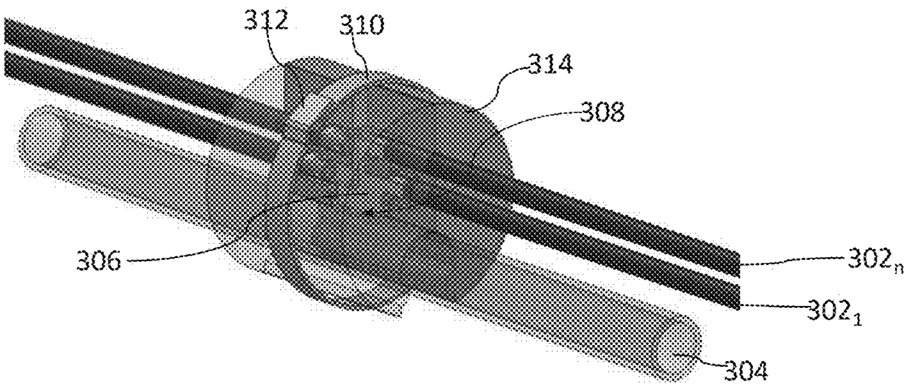
Figure 3C:
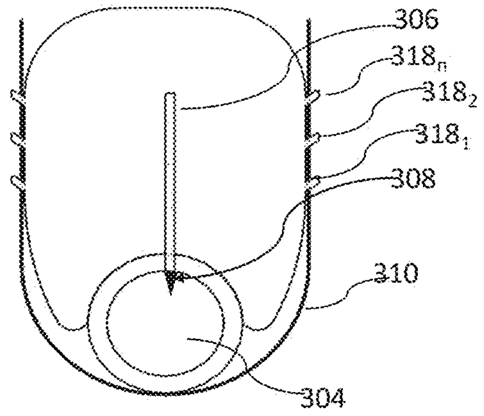

FIG. 3C illustrates a cross section 300" of the part of system or device 300 illustrated in FIG. 3A. As illustrated in FIGS. 3B and 3C, at the bottom of the central busbar 306, there are "teeth' or sharp pointy peaks (a piercing pattern) 308, which may be used to penetrate the insulation of the larger cable 304. The one or more power cables $\mathbf{302}_1$, . . . $\mathbf{302}_n$ and the central busbar 306 may be self-contained in a main body of insulating material 314, only the sharp edges of the peaks 308 may be exposed.

Figure 3D:
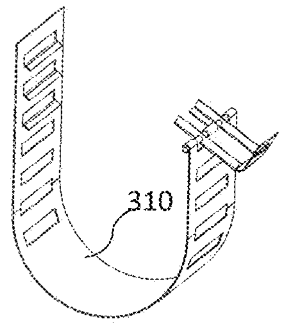
Figure 3E:
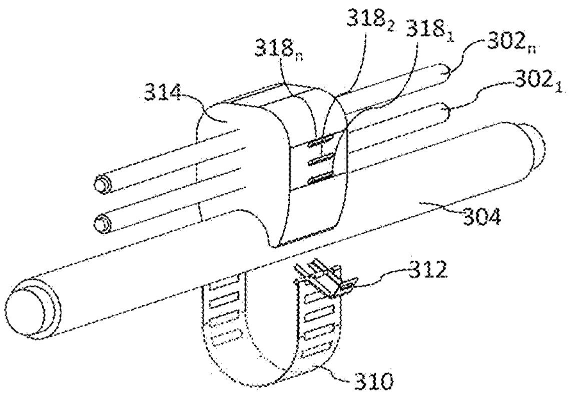
Figure 3F:
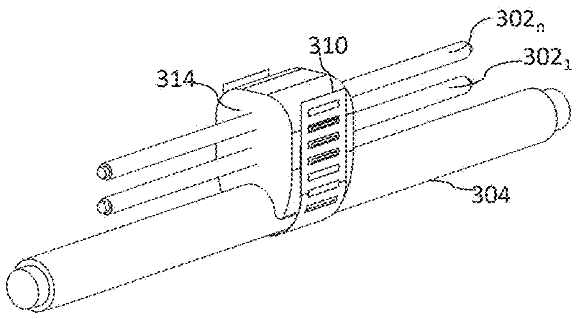

The main body assembly 314 may be provided with a built-in latch mechanism including latches $\mathbf{318}_1$, . . . $\mathbf{318}_n$ to tightly attach the strap 310, as illustrated in FIG. 3D, to the main body 314 and the strap 310 may be provided with pins to attach to the latches $\mathbf{318}_1$, . . . $\mathbf{318}_n$ provided on the main body 314. Once the entire assembly including the larger cable 304 is in place the strap 310 may be tightened and locked in place using the locking mechanism 312 as illustrated in FIGS. 3E and 3F.

Figure 4:
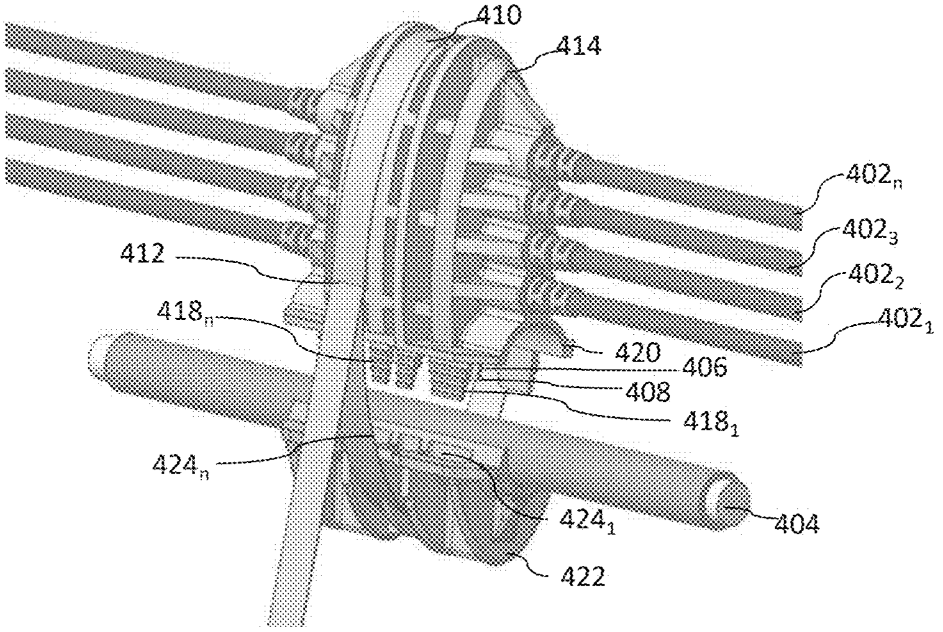
FIG. 4 illustrates an example system for connecting one or more cables to a larger cable via central busbar according to one or more embodiments described herein.

FIG. 4 illustrates an example system or device 400 for connecting one or more cables to a larger cable via central busbar according to one or more embodiments described herein. The system for connecting one or more cables $\mathbf{402}_1$, . . . $\mathbf{402}_n$ to a larger cable 404 via central busbar 406 includes a central busbar 306 including at least one connection end 408, wherein the central busbar 306 is connected to one or more cables $\mathbf{402}_1$, . . . $\mathbf{402}_n$, and wherein the at least one connection end 308 is sharp such that it is capable of penetrating the insulation of the larger cable 404 and makes an electrical connection between the one or more cables $\mathbf{402}_1$, . . . $\mathbf{402}_n$ and the larger cable 404 via central busbar 406 when penetrated in the insulation of the larger cable 404. The one or more incoming power cables $\mathbf{402}_1$, . . . $\mathbf{402}_n$ are electrically and mechanically attached or connected to a central busbar 406 which is made of an electrically conductive material. The at least one connection end 408 may be made of an electrically conductive material. The connection end may include a piercing pattern also referred to herein as "teeth' or sharp pointy peaks, which are capable of penetrating the insulation of the larger cable 404. The connection end 408 may be provided on a side of the of the central busbar 406 where the large sink cable 404 is to be attached.

As illustrated in FIG. 4, at the bottom of the central busbar 406, there are "teeth' or sharp pointy peaks (a piercing pattern) 408, which may be used to penetrate the insulation of the larger cable 404. The one or more power cables $\mathbf{402}_1$, . . . $\mathbf{402}_n$ and the central busbar 406 may be self-contained in a main body of insulating material 414, only the sharp edges of the peaks 408 may be exposed.

The main body assembly 414 may be provided with a clamshell type system with a top shell 420 including a built-in latch mechanism having latches $\mathbf{418}_1$, . . . $\mathbf{418}_n$ and bottom shell 422 including grooves $\mathbf{424}_1$, . . . $\mathbf{424}_n$ for the latches $\mathbf{418}_1$, . . . $\mathbf{418}_n$ respectively, to tightly attach the strap 410 to the main body 414. Once the entire assembly including the larger cable 404 is in place, the strap 410 may be tightened and locked in place using the locking mechanism 412 as illustrated in FIG. 4. Although, clam shells are described as top shell 420 and bottom shell 422, a person skilled in the art may readily recognize that the design can also be described as first shell 420, which can be at the top or the bottom depending on the orientation of the device and second shell 422, which can be at the top or the bottom depending on the orientation of the device, and is within the spirit and scope of the invention.

The clamshell design, for example, may include a pipe manifold 420 and a cable carrier 422 that come together and for a singular body enclosing the larger cable 404 attached to the central busbar 406, which is then tightly strapped in place using a strap 410 which may be tightened and locked in place using the locking mechanism 412.

Figure 5:
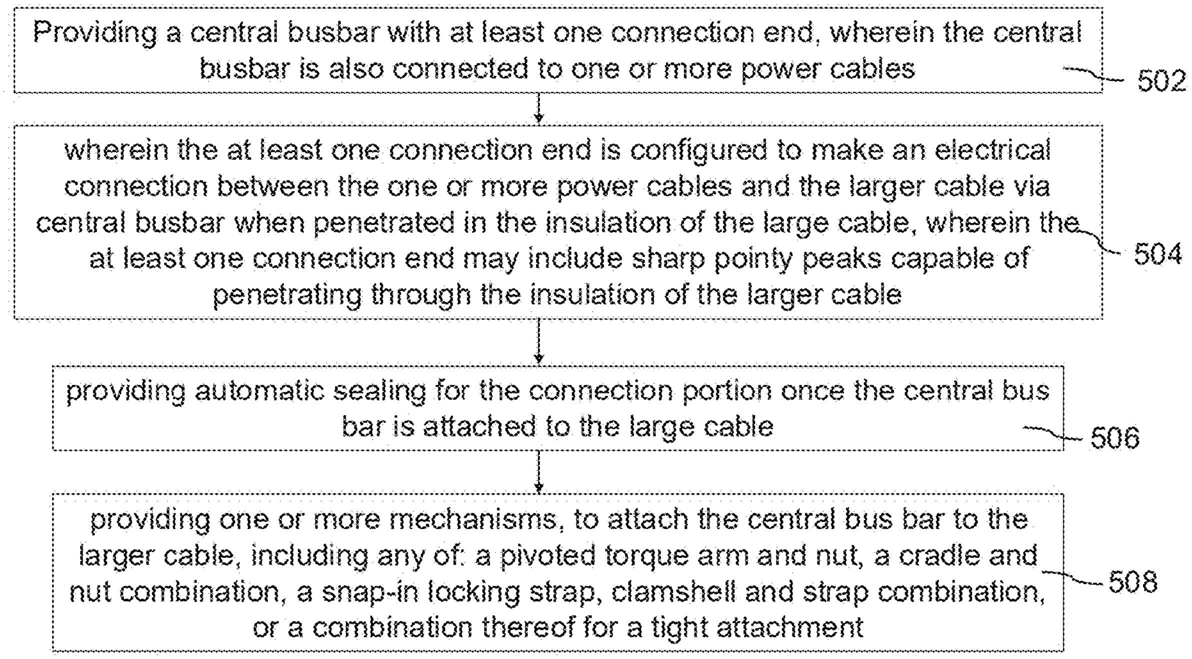
FIG. 5 illustrates an example method for providing an insulation piercing electrical connector device or a system for connecting one or more cables to a larger cable via central busbar according to one or more embodiments described herein.

FIG. 5 illustrates an example method 500 for providing an insulation piercing electrical connector device or a system for connecting one or more cables to a larger cable via central busbar according to one or more embodiments described herein. The method for connecting one or more cables to a larger cable via central busbar includes: providing a central busbar with at least one connection end via step 502, wherein the central busbar is also connected to one or more cables; wherein the at least one connection end is sharp such that it is capable of penetrating the insulation of the larger cable via step 504 and to make an electrical connection between the one or more cables and the larger cable via central busbar.

Additionally, or alternatively, in an embodiment, the at least one connection end may be made of an electrically conductive material.

Additionally, or alternatively, in an embodiment, the at least one connection end may be made of sharp pointy peaks. For example, at the bottom of the central busbar, there are "teeth' or sharp pointy peaks (a piercing pattern) capable of penetrating the insulation of the larger cable, which may be used to penetrate the insulation of the larger cable. The "teeth" or sharp pointy peaks are made of material with good electrical conductivity, which may be the same as central busbar. The one or more power cables and the central busbar may be self-contained in a main body of insulating material, and only the sharp edges of the peaks may be exposed.

Additionally, or alternatively, in an embodiment, the method may further include, providing automatic sealing for the connection portion once the central bus bar is attached to the larger cable via step 506.

Once the one or more cables or wires may be connected to the central busbar, by, including but not limited to, soldering or sonic welding, etc., and the whole assembly may then be insulated, except the "teeth", that may bite into the main cable. Once connected (after the bite), the connection may be insulated too.

Additionally, or alternatively, in one or more embodiments, the method may further include providing one or more mechanisms to attach the central bus bar to the larger cable, wherein the one or more mechanisms include any of: a pivoted torque arm and nut, a cradle and nut combination, a snap-in locking strap, clamshell and strap combination, or a combination thereof for a tight attachment via step 508. Using any one or more of the mechanisms described above, the larger cable is pierced, sealed, and connected to the main body assembly, which includes the central busbar.

Each of the mechanisms described herein are illustrated in FIGS. 1-4 and described in detail in the description accompanying FIGS. 1-4.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

As used herein the terms product, device, appliance, etc. are intended to be inclusive, interchangeable, and/or synonymous with one another and other similar equipment for purposes of the present invention though one will recognize that functionally each may have unique characteristics, functions and/or operations which may be specific to its individual capabilities.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A system for connecting a plurality of connection cables to a larger cable, the system comprising:
- the plurality of connection cables;
- the larger cable comprising electrical insulation, the larger cable having a larger diameter than each of the plurality of connection cables; and
- a connector assembly configured to electrically connect the plurality of connection cables with the larger cable, the connector assembly comprising:
  - a plurality of electrical connections configured to electrically connect to the plurality of connection cables;
  - a connection end comprising one or more piercing elements configured to penetrate the electrical insulation of the larger cable when the connector assembly is coupled to the larger cable, the one or more piercing elements electrically connected with the plurality of electrical connections; and
  - a mechanical coupling mechanism configured to:
    - mechanically couple the connector assembly to the larger cable;
    - cause the one or more piercing elements to penetrate the electrical insulation of the larger cable and to electrically connect the larger cable with the plurality of electrical connections; and
    - automatically seal the electrical connection at the one or more piercing elements;
  - wherein the mechanical coupling mechanism comprises any of:
    - a pivoted torque arm and nut, a cradle and nut combination, a snap-in locking strap, clamshell and strap combination, or a combination thereof.

2. The system of claim 1, wherein the mechanical coupling comprises the clamshell and strap combination that includes:
- a clamshell structure including a main body assembly and a bottom shell, the main body assembly and the bottom shell configured to surround a portion of the larger cable; and
- a strap configured to surround the main body assembly and the bottom shell and to be tightened to secure the main body assembly and the bottom shell around the portion of the larger cable.

3. The system of claim 1, wherein the mechanical coupling mechanism comprises the clamshell and strap combination that includes:
- a main body assembly having latches couplable to grooves of a bottom shell; and
- a strap configured to surround the connector assembly and be tightened to secure the bottom shell to the main body assembly, the bottom shell and the main body assembly enclosing the larger cable when coupled together.

4. The system of claim 1, wherein the one or more piercing elements comprise sharp peaks capable of penetrating the electrical insulation of the larger cable.

5. The system of claim 1, wherein the connection end is configured such that, upon penetration of the electrical insulation of the larger cable by the one or more piercing elements of the connection end, a seal is automatically formed between the connection end and the larger cable.

6. A method for connecting one or more connection cables to a larger cable, the method comprising:
- providing a connector assembly comprising:
  - a mechanical coupling mechanism, the mechanical coupling mechanism comprising one or more of:
    - a pivoted torque arm and nut, a cradle and nut combination, a snap-in locking strap, or a clamshell and strap combination;
  - one or more electrical connections electrically connected to one or more connection cables; and
  - a connection end comprising one or more piercing elements, the one or more piercing elements electrically connected to the one or more electrical connections; and
- securing the connector assembly to the larger cable by adjusting the mechanical coupling mechanism, the adjusting of the mechanical coupling mechanism causing the one or more piercing elements of the connection end to penetrate insulation of the larger cable and electrically connect to the larger cable.

7. The method of claim 6, wherein the mechanical coupling mechanism comprises the clamshell and strap combination that includes:
- a clamshell structure including a main body assembly and a bottom shell, the main body assembly and the bottom shell configured to surround a portion of the larger cable; and
- a strap configured to surround the main body assembly and the bottom shell; wherein
- adjusting the mechanical coupling mechanism comprises tightening the strap about the clamshell structure.

8. The method of claim 7, wherein:
- the main body assembly comprises one or more latches configured to couple to corresponding one or more grooves of the bottom shell; and
- adjusting the mechanical coupling mechanism further comprises coupling the one or more latches to the corresponding one or more grooves.

9. The method of claim 6, wherein the one or more piercing elements comprise sharp peaks configured to penetrate the insulation of the larger cable.

10. The method of claim 6, wherein the one or more connection cables comprise between two and eight cables, the cables each having a smaller diameter than the larger cable.

11. The method of claim 6, wherein securing the connector assembly to the larger cable mechanically seals the electrical connection between the connection end and the larger cable.

12. The method of claim 6, wherein the one or more electrical connections of the connector assembly and the one or more piercing elements of the connection end are part of a central busbar, the central busbar made of an electrically conductive material.

13. A connector assembly for connecting a plurality of connection cables to a larger cable comprising insulation, comprising:

a main body assembly;

a mechanical coupling mechanism configured to mechanically couple the main body assembly to a larger cable, the mechanical coupling mechanism comprising one or more of:

a pivoted torque arm and nut, a cradle and nut combination, a snap-in locking strap, or a clamshell and strap combination;

a plurality of electrical connections configured to electrically connect with the plurality of connection cables; and a connection end comprising one or more piercing elements, the one or more piercing elements being electrically connected with the plurality of electrical connections and configured to penetrate insulation of the larger cable when the main body assembly is mechanically coupled to the larger cable.

14. The connector assembly of claim 13, wherein the mechanical coupling mechanism comprises the clamshell and strap combination that includes:

a bottom shell configured to partially surround the larger cable;

latches on the main body assembly couplable to grooves on the bottom shell; and a strap configured to surround the main body assembly and the bottom shell to secure the bottom shell to the main body assembly, the bottom shell and the main body assembly enclosing the larger cable when coupled together.

15. The connector assembly of claim 13, wherein the connection end is configured such that, upon penetration of the insulation of the larger cable by the one or more piercing elements of the connection end, a seal is automatically formed between the connection end and the larger cable.

16. The connector assembly of claim 13, wherein the plurality of electrical connections are configured to be attached to the plurality of connection cables by soldering, welding, or mechanical fastening.

17. The connector assembly of claim 13, wherein the one or more piercing elements comprise peaks formed of an electrically conductive material.

18. The connector assembly of claim 13, further comprising a busbar formed of an electrically conductive material, the busbar including the plurality of electrical connections and the one or more piercing elements in a single piece.

* * * * *